United States Patent [19]

Stover et al.

[11] 4,447,061

[45] May 8, 1984

[54] MELT PUMP SEAL WITH VACUUM HOUSING

[75] Inventors: Richard W. Stover; Frederick T. Proper, both of Chester, Va.; Steven A. Young, Cary, N.C.

[73] Assignee: Allied Corporation, Morris Township, Morris County, N.J.

[21] Appl. No.: 385,237

[22] Filed: Jun. 4, 1982

[51] Int. Cl.³ .............................................. F16J 15/40
[52] U.S. Cl. ............................................ 277/1; 277/3; 277/12; 159/2 E
[58] Field of Search ...................... 277/1, 3, 226, 27, 9, 277/15, 32, 12, 66, 187, 130–132, 237; 159/2 E; 422/132, 135, 213; 416/177; 366/279

[56] References Cited

U.S. PATENT DOCUMENTS

| | | | |
|---|---|---|---|
| 701,957 | 6/1902 | Staley | 159/2 E |
| 1,037,647 | 9/1912 | London | 277/27 |
| 1,590,778 | 6/1926 | Schein | 277/3 |
| 2,973,187 | 2/1961 | Wehmer | 366/279 X |
| 3,036,335 | 5/1962 | Heston et al. | 159/2 E |
| 3,144,035 | 8/1964 | Hablanian et al. | 277/1 X |
| 3,361,537 | 1/1968 | Ferrante | 23/283 |
| 3,795,386 | 3/1974 | Carter et al. | 277/32 X |
| 3,797,550 | 3/1974 | Latinen | 159/2 E |
| 3,993,292 | 11/1976 | Skidmore | 159/2 E X |
| 4,118,042 | 10/1978 | Booth | 277/226 |
| 4,191,385 | 3/1980 | Fox | 277/226 X |

FOREIGN PATENT DOCUMENTS 685246  4/1964  Canada ............................ 159/2 E Primary Examiner—Robert S. Ward

[57] ABSTRACT

A method and apparatus for preventing fluid leakage through a sealing mechanism of a melt pump into a vessel during the period of establishing a vacuum therein and increasing the viscosity of the material fed thereto. The method includes enclosing in a fluid-tight relationship the area of fluid leakage adjacent the sealing mechanism and reducing the pressure in the enclosed area sufficiently to prevent the fluid from leaking. The apparatus includes a rigid housing which encloses in fluid-tight relationship the area of fluid leakage adjacent the sealing mechanism, a vacuum generating device, and means for connecting the vacuum generating device with the enclosed area.

4 Claims, 2 Drawing Figures

MELT PUMP SEAL WITH VACUUM HOUSING

BACKGROUND OF THE INVENTION

1. Field of the Invention

The present invention relates to a method and apparatus for preventing fluid leakage through a sealing mechanism of a melt pump into a vessel during the period of establishing a vacuum therein and increasing the viscosity of the material fed thereto. More particularly, the method and apparatus of the present invention prevent air leakage up the annular space, defined by an extractor screw shaft and housing, through the shaft packing and around the extractor screw or other melt pump into a reactor during the period of establishing a vacuum therein and increasing the viscosity of the polymer fed thereto.

2. The Prior Art

This invention is particularly adapted for use in a process for the preparation of linear condensation polyesters, e.g., as described in U.S. Pat. No. 3,689,461 to Balint et al., hereby incorporated by reference. In the polycondensation reactors, the polymer melt with monomer and/or solvent dissolved therein is subjected to temperature and pressure conditions favoring utilization of the lower boiling fraction. Elevated temperatures and subatmospheric pressures [e.g., 270°–300° C. and 1 to 5 Torr (133–667 Pa)] are typical. A vertical extractor screw or other melt pump, such as a gear pump, discharges the product horizontally through an exit port above the extractor screw shaft and shaft housing. During normal operations, the extractor screw generates sufficient pressure in the vicinity of the exit port to preclude any fluid leakage up the annular space, defined by the extractor screw shaft and its housing, into the reactor; however, the highly viscous discharge product occasionally leaks down the annular space and may ultimately freeze the shaft, i.e., prevent its rotation. Also, during periods of establishing a vacuum in the reactor and increasing the viscosity of the material fed thereto, e.g., during startup, the pressure generated by the extractor screw is generally insufficient to prevent fluid leakage, usually air, up and into the reactor. If a sufficient amount of air leaks into the reactor, a vacuum cannot be drawn. Further, the air blows polymer onto the reactor walls and down where it stays and degrades. Also, the oxygen present in the air causess degradation products. Thus, it is necessary to maintain adequate seals around the screw shaft.

Prior art techniques for sealing shafts entering or exiting reactors generally involve the use of packed stuffing boxes or of mechanical seals. Stuffing boxes generally have some tendency to leak in vacuum service. Typically, they require considerable attention and frequent tightening and even replacement of worn packing to keep them in satisfactory operating condition. In addition, the polymer may be contaminated by particles of worn packing, by any lubricant which may be necessary or desirable in the stuffing box, and by leakage of air.

Mechanical seals are usually less subject to leakage and wear; they too require occasional replacement and may be subject to lubricant and/or coolant leakage when lubricant or coolant is required. When mechanical seals are used on high viscosity fluids, such as a polymer melt, these fluids tend to cause the sealing means between the rotating shaft and the rotating seal face to become stuck or frozen and this result does not permit the axial movement of the rotating seal face which is necessary for proper operation of a mechanical seal.

The present invention has been developed, therefore, to eliminate the aforementioned fluid leakage. In this regard, U.S. Pat. No. 3,795,386 to Carter et al., hereby incorporated by reference, is believed to be pertinent prior art.

SUMMARY OF THE INVENTION

The present invention provides a method and apparatus for preventing fluid leakage through a sealing mechanism of a melt pump into a vessel during the period of establishing a vacuum therein and increasing the viscosity of the material fed thereto.

The method comprises the steps of enclosing in a fluid-tight relationship the area of fluid leakage adjacent the sealing mechanism; and reducing the pressure in the enclosed area sufficiently to prevent the fluid from leaking. It is preferred that the pressure reducing step comprise connecting a vacuum generating device to the enclosed area, and operating the same. By vacuum generating device is meant a vacuum pump or a vacuum jet.

The apparatus comprises: a rigid housing which encloses in fluid-tight relationship the area of fluid leakage adjacent the sealing mechanism; a vacuum generating device; and means for connecting the vacuum generating device with the enclosed area.

In the most preferred embodiment the apparatus is provided for preventing air leakage through an extractor screw on a reactor via an annular space, defined by an extractor screw shaft, shaft packing and housing, air leakage being through the shaft packing into the reactor during a period of establishing a vacuum therein when increasing the viscosity of the polymer fed thereto. The apparatus includes a pair of clamping rings, a hinge pin, locking guides, a rigid cylindrical housing, a gasket, a vacuum pump, and a vacuum pump connector. The clamping rings are each formed of two parts which are hinged for pivotal movement to open and closed positions about the hinge pin, which separates the clamping rings. The locking guides are attached to the clamping rings for locking the clamping rings in the closed position around the screw shaft housing. The rigid, cylindrical housing is formed of two parts which are hinged for pivotal movement to open and closed positions about the hinge pin between the clamping rings. The gasket material lines at least the periphery of the interior surface of each of the housing parts. Means is provided for maintaining the two housing parts in the closed position around the screw shaft housing in fluid-tight relationship therewith to enclose the area of fluid leakage. Means is also provided for connecting the vacuum pump with the enclosed area of fluid leakage through the vacuum pump connector, which is located on one of the two housing parts.

The melt pump, which is a device to move molten polymer, may be any kind of pump, such as a gear pump, feed screw or extractor screw, preferably the latter.

The invention will be more clearly understood and additional objects and advantages will become apparent upon reference to the discussion below and to the drawings which are given for illustrative purposes.

DETAILED DESCRIPTION OF THE INVENTION

With reference to the accompanying drawings, like numbers indicate like apparatus. In the preferred embodiment of the invention, the polycondensation reactor 10 is as described in U.S. Pat. No. 3,617,225 to Kuehne et al., hereby incorporated by reference. Alternately, reactor 10 may be a wiped-wall reactor as described in U.S. Pat. No. 3,976,431 to Boggs et al., hereby incorporated by reference.

Figure 1:
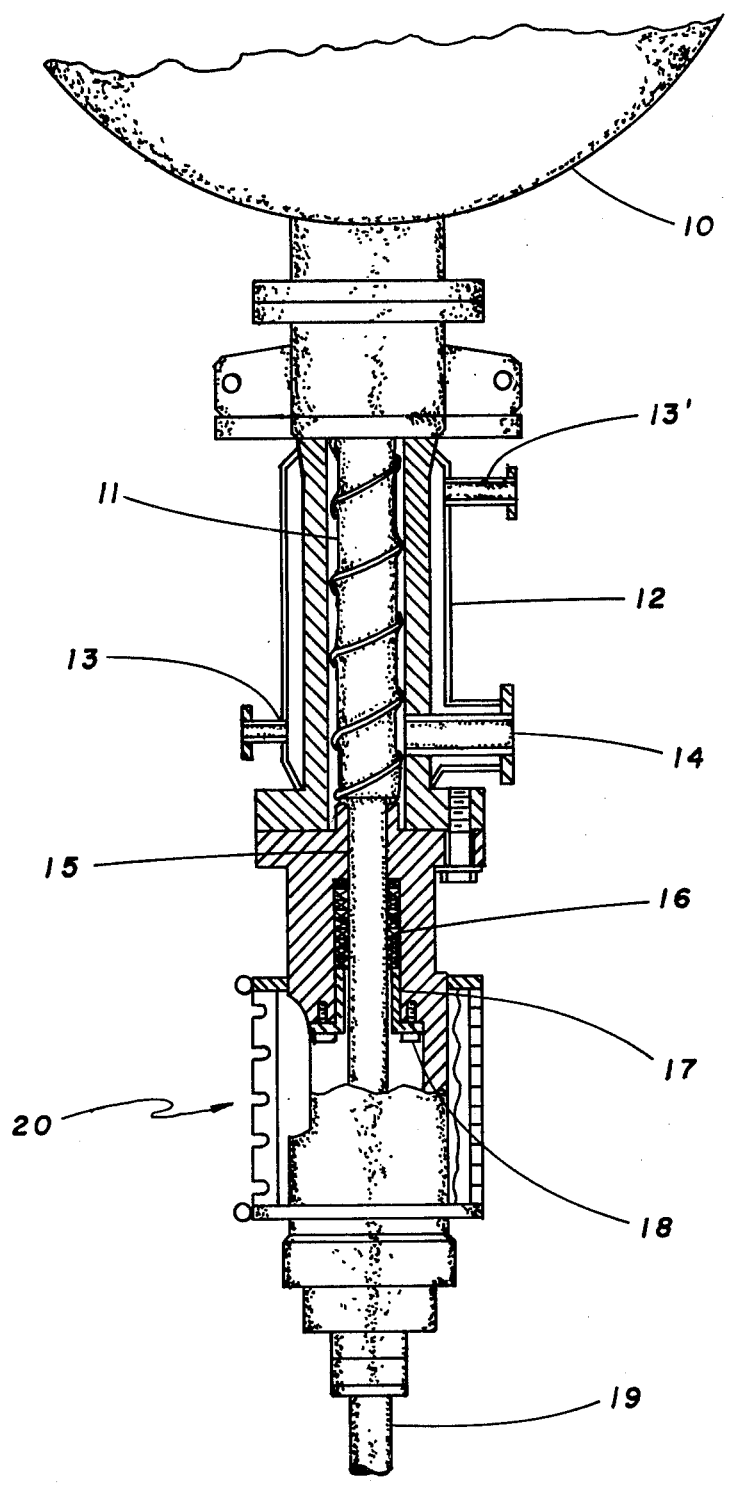
FIG. 1 is a schematic in partial section of the exit end of a reactor with associated extractor screw and packed stuffing box with enclosure 20 in place.

With reference to FIG. 1, the product is conveyed from reactor 10 to exit port 14 via the rotational movement of extractor screw 11 in the chamber created between screw 11 and its jacketed 12 housing. Inlet 13 and outlet 13' ports provide, respectively, for the supply and removal of a heat transfer medium, specifically Dowtherm A, a trademark of Dow Chemical Company for a eutectic mixture of diphenyl and diphenyl oxide, to jacket 12. Extractor screw 11 is coupled to screw shaft 15 which in turn is coupled to drive shaft 19. Drive shaft 19 is connected below (unshown), in sequence, to universal joint, right angle gear box and a motor, by which drive shaft 19 is driven.

Screw shaft 15 is sealed by a packed stuffing box comprising packing material 16, packing follower 17, and bolts 18. Packing material 16, which is a high temperature resistant material like graphite or impregnated asbestos, is compressed into the annular space defined by screw shaft 15 and its housing by packing follower 17, a flanged cylinder attached to the housing by bolts 18. The housing surrounding elements 15 through 18 is heated by a heating coil, unshown, to prevent polymer which may leak into the annular space from above from freezing screw shaft 15. Beneath packing follower 17, the housing is cut away in two places to permit access to bolts 18. When enclosure 20 is not in the closed position depicted in FIG. 1, air at atmospheric pressure has access to the annular space about shaft 15, including packing material 16. Next below the gap beneath packing follower 17 is a conventional bearing carriage assembly, unshown, similar to that shown in FIG. 2 of U.S. Pat. No. 3,795,386 to Carter et al. Fluid leakage from this area is prevented by lip seals which are lubricated with a clean, cool bearing oil.

Figure 2:
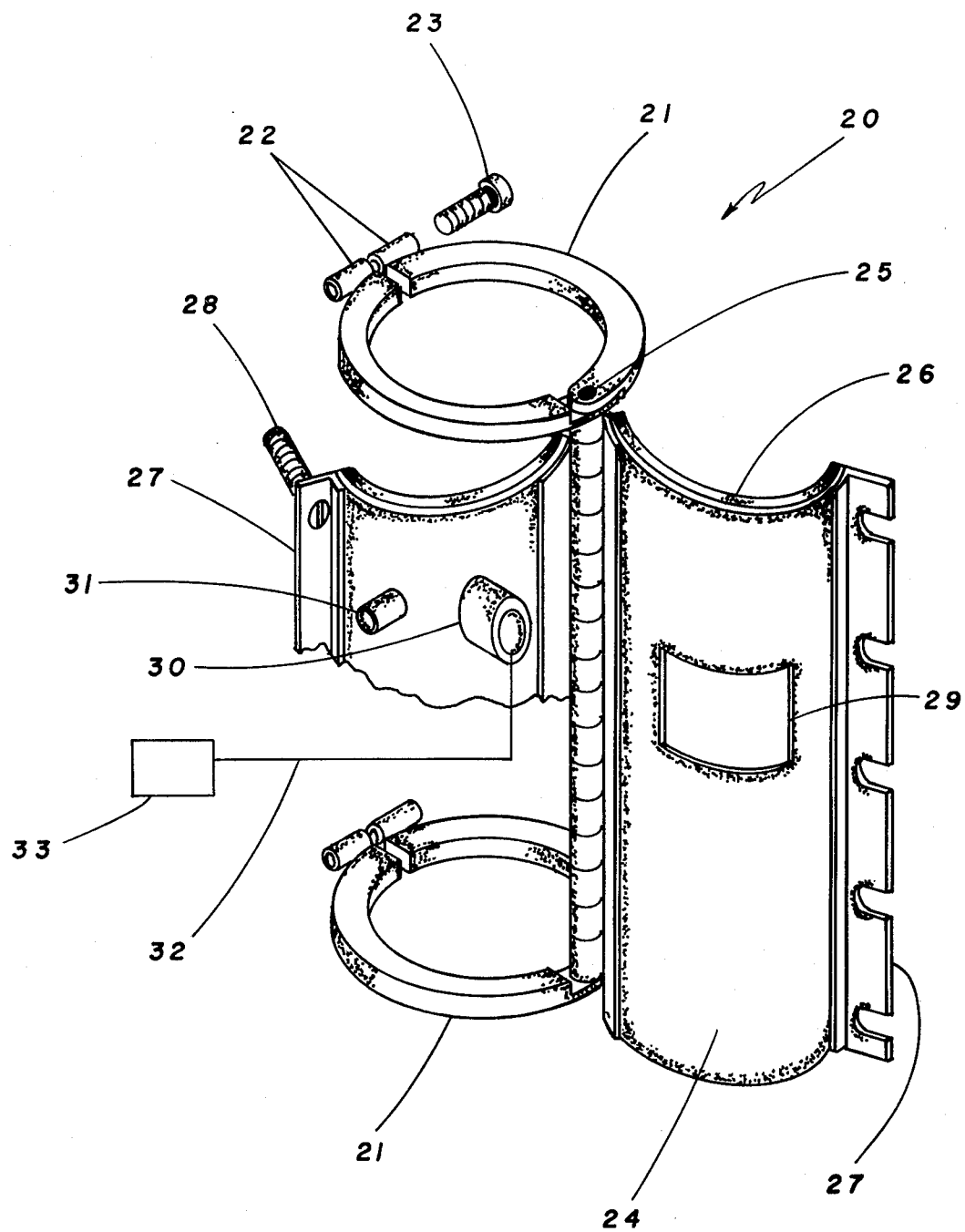
FIG. 2 is an isometric view of enclosure 20, partially cut away, in the open position.

During normal operation, extractor screw 11 generates sufficient pressure in the vicinity of exit port 14 above shaft packing 16 to preclude any air leakage up the annular space defined by screw shaft 15 and its housing, ultimately into reactor 10. However, during a start-up when a vacuum is being established in reactor 10 and the viscosity of the polymer is being increased, the pressure generated by extractor screw 11 is generally insufficient to prevent air from leaking up the annular space through shaft packing 16 around extractor screw 11 and into reactor 10, the disadvantages of which have been outlined above. FIG. 2 shows in greater detail enclosure 20 which was developed to eliminate this air leakage.

As shown in FIG. 2, enclosure 20 comprises: a pair of clamping rings 21; hinge pin 25; locking guides 22; rigid, cylindrical housing 24; and gasket material 26. Clamping rings 21 are each formed of two parts which are hinged for pivotal movement to open and closed positions about hinge pin 25, which also separates clamping rings 21. Locking guides 22 are attached to clamping rings 21 for locking clamping rings 21 in the closed position around the screw shaft housing as shown in FIG. 1. Each locking guide 22 comprises a pair of cylinders, one cylinder per part of clamping ring 21 which are coaxially aligned when clamping ring 21 is in the closed position. Bolt 23 completes the locking of guide 22 around the screw shaft housing. Housing 24 is formed of two parts which are hinged for pivotal movement to open and closed positions about hinge pin 25 between clamping rings 21. Gasket material 26 lines at least the periphery of the interior surface of each of the two parts of housing 24, and may line the interior completely if desired. Window 29 is provided in one of the parts to inspect for buildup of polymer or bearing oil leakage. Connector 30 is provided on the other part for attachment to vaccuum pump 33 via connecting means 32, which may be a vacuum hose and/or piping. At numeral 31 is located a vacuum gauge connector for connection with a vacuum gauge which ensures that a vacuum is being pulled in the enclosed area when vacuum pump 33 is operational. Closing brackets 27 and bolts 28 provide the means for maintaining the two housing 24 parts in the closed position around the screw shaft housing in fluid-tight relationship therewith to enclose the area of air leakage.

The materials of construction are preferably as follows: For the gaskets, a synthetic rubber such as neoprene or Viton, trademark of E. I. duPont de Nemours Company for several fluoroelastomers; for clamping rings 21, a hard metal such as carbon steel; for window 29, a Plexiglas sheet, trademark of Rohm & Haas Company for a thermoplastic poly(methyl methacrylate)-type polymer in cast sheet; for the screws, carbon steel or stainless steel; and for the other elements, a metal such as stainless steel or aluminum.

It is considered within the scope of this invention to provide a non-hinged housing as the enclosure which may be mounted in some other fashion.

Enclosure 20 is placed in operation as follows: Housing parts 24 and clamping rings 21 are pivoted into their open positions and placed adjacent the screw shaft housing with one clamping ring 21 above the cut away access to bolts 18 and the other clamping ring 21 therebelow. The clamping rings 21 are moved to their closed position and locked via locking guides 22 and bolts 23. Housing parts 24 are then pivoted to the closed position and housing 24 is closed around the screw shaft housing in fluid-tight relationship therewith to enclose the area of air leakage by connecting brackets 27 with bolts 28. A heavy vacuum hose 32 connects vacuum pump connector 30 with, ultimately, vacuum pump 33. Vacuum pump 33 is cut on to reduce the pressure in the enclosed area sufficiently to prevent leakage of air up through packing material 16, i.e., a vacuum is put on the enclosed area. Then, a vacuum is pulled on reactor 10, followed by introduction of feed material to reactor 10.

The method and apparatus of the present invention, as described, is very successful in preventing air leakage up the annular space defined by screw shaft 15 and its housing, through shaft packing 16 into reactor 10 during the period of establishing a vacuum in reactor 10 and increasing the viscosity of the polymer fed to reactor 10.

We claim:

1. A method for preventing fluid leakage through a sealing mechanism of a melt pump into a vessel during the period of establishing a vacuum therein and increasing the viscosity of the material fed thereto, said melt pump comprising a shaft which rotates in a space between said sealing mechanism and said vessel and which rotates adjacent said sealing mechanism, comprising the steps of:
   a. enclosing in a fluid-tight relationship the area of fluid leakage adjacent the sealing mechanism; and
   b. reducing the pressure in the enclosed area sufficiently to prevent the fluid from leaking.

2. The method of claim 1 wherein the pressure reducing step comprises connecting a vacuum generating device to the enclosed area, and operating the vacuum generating device.

3. Apparatus for preventing fluid leakage through a sealing mechanism of a melt pump into a vessel during the period of establishing a vacuum therein and increasing the viscosity of the material fed thereto, said melt pump comprising a shaft which rotates in a space between said sealing mechanism and said vessel and which rotates adjacent said sealing mechanism, comprising:
   a. a rigid housing which encloses in fluid-tight relationship the area of fluid leakage adjacent the sealing mechanism;
   b. a vacuum generating device; and
   c. means for connecting the vacuum generating device with the enclosed area.

4. Apparatus for preventing air leakage through an extractor screw on a reactor via an annular space, defined by an extractor screw shaft, shaft packing and housing, air leakage being through the shaft packing into the reactor during a period of establishing a vacuum therein when increasing the viscosity of the polymer fed thereto, comprising:
   a. a pair of clamping rings, each formed of two parts which are hinged for pivotal movement to open and closed positions about:
   b. a hinge pin, which separates the clamping rings;
   c. locking guides attached to the clamping rings for locking the clamping rings in the closed position around the screw shaft housing;
   d. a rigid, cylindrical housing, formed of two parts which are hinged for pivotal movement to open and closed positions about the hinge pin between the clamping rings;
   e. a gasket, lining at least the periphery of the interior surface of each of the two housing parts;
   f. means for maintaining the two housing parts in the closed position around the screw shaft housing in fluid-tight relationship therewith to enclose the area of fluid leakage;
   g. a vacuum pump; and
   h. means for connecting the vacuum pump with the enclosed area of fluid leakage through
   i. a vacuum pump connector located on one of the two housing parts.

* * * * *